US011479326B2

(12) United States Patent
Trewern (10) Patent No.: US 11,479,326 B2
(45) Date of Patent: Oct. 25, 2022

(54) POWERED HYDROFOIL SYSTEM (71) Applicant: Fliteboard Pty Ltd, Byron Bay (AU)

(72) Inventor: David Trewern, Ewingsdale (AU)

(73) Assignee: FLITEBOARD PTY LTD, Byron Bay (AU)

(*) Notice: Subject to any disclaimer, the term of this patent is extended or adjusted under 35 U.S.C. 154(b) by 0 days.

(21) Appl. No.: 16/628,905

(22) PCT Filed: Nov. 28, 2018

(86) PCT No.: PCT/AU2018/051265
§ 371 (c)(1),
(2) Date: Jan. 6, 2020

(87) PCT Pub. No.: WO2019/104378
PCT Pub. Date: Jun. 6, 2019

(65) Prior Publication Data
US 2020/0189691 A1 Jun. 18, 2020

(30) Foreign Application Priority Data

Nov. 28, 2017 (AU) .................................. 2017268537
Aug. 29, 2018 (AU) .................................. 2018222940

(51) Int. Cl.
*B63B 32/10* (2020.01)
*B63H 21/17* (2006.01)
(Continued)

(52) U.S. Cl.
CPC .............. *B63B 32/10* (2020.02); *B63B 32/64* (2020.02); *B63B 34/40* (2020.02); *B63H 21/17* (2013.01)

(58) Field of Classification Search
CPC ........... B63B 1/24; B63B 1/242; B63B 1/246; B63B 1/248; B63B 1/26; B63B 32/00;
(Continued)

(56) References Cited

U.S. PATENT DOCUMENTS 5,362,264 A 11/1994 Parant
5,672,080 A 9/1997 Gauthier
(Continued)

FOREIGN PATENT DOCUMENTS

AU 2017268537 B1 7/2018
AU 20182252940 B1 7/2019
(Continued)

OTHER PUBLICATIONS

Evolo Final Report; 280 pages; Published Apr. 23, 2009.*
(Continued)

*Primary Examiner* — Ajay Vasudeva
(74) *Attorney, Agent, or Firm* — Tarolli, Sundheim, Covell & Tummino LLP (57) ABSTRACT A hydrofoil system is disclosed, having a fuselage with a propeller mounted to one end of the fuselage and a wing extending laterally from the fuselage. The fuselage is configured for removable attachment to a mast, so that the mast when attached extends from the fuselage in a direction substantially orthogonal to the longitudinal axis and also substantially orthogonal to the wing. A tail wing is connected to the fuselage by a tail strut, so that the tail wing is positioned beyond the end of the fuselage to which the propeller is attached. A motor is housed in the fuselage and has a cable connected thereto, the cable extending outside the fuselage, wherein a removable sealing system inhibits water ingress to the motor at the location where the cable is connected when the sealing system is installed in the fuselage.

16 Claims, 4 Drawing Sheets (51) Int. Cl.
*B63B 32/64* (2020.01)
*B63B 34/40* (2020.01)

(58) Field of Classification Search
CPC ......... B63B 32/10; B63B 32/60; B63H 21/17; H02G 3/22; H02G 15/013
See application file for complete search history.

(56) References Cited

U.S. PATENT DOCUMENTS

| | | | |
|---|---|---|---|
| 6,178,905 | B1 | 1/2001 | Dynes et al. |
| 7,047,901 | B2 * | 5/2006 | Chen ..................... B63B 1/246 114/281 |
| D843,303 | S * | 3/2019 | Leason ..................... D12/309 |
| 10,597,118 | B2 * | 3/2020 | Montague .............. B63B 32/10 |
| 10,836,457 | B2 * | 11/2020 | Geislinger .............. B60L 53/80 |
| 11,097,822 | B2 * | 8/2021 | Aoki ....................... B63B 32/10 |
| 2002/0124783 | A1 | 9/2002 | Dynes |
| 2003/0167991 | A1 | 9/2003 | Namanny |
| 2008/0132127 | A1 | 6/2008 | Jansen |
| 2011/0111650 | A1 | 5/2011 | Braden et al. |
| 2011/0201238 | A1 | 8/2011 | Rott et al. |
| 2016/0185430 | A1 | 6/2016 | Langelaan |
| 2016/0325815 | A1 | 11/2016 | Nikmanesh |
| 2016/0347428 | A1 | 12/2016 | Mahar |
| 2018/0072383 | A1 | 3/2018 | Montague et al. |
| 2019/0389551 | A1 * | 12/2019 | Aoki ....................... B63H 11/08 |

FOREIGN PATENT DOCUMENTS

| | | |
|---|---|---|
| CN | 104828215 A | 8/2015 |
| DE | 102014005314 A1 | 10/2015 |
| DE | 202017103703 U1 | 7/2017 |
| DE | 102016012068 A1 | 4/2018 |
| WO | 19970042073 A1 | 11/1997 |
| WO | 2016071625 A2 | 5/2016 |

OTHER PUBLICATIONS

International Search Report for International Application No. PCT/AU2018/051265 dated Jan. 23, 2019.

Applicant: Fliteboard PTY LTD; European Patent Application No. 18883938.5; "Powered Hydrofoil System"; Third Party Observations; 87 pgs., dated Feb. 23, 2021.

Applicant: Fliteboard Pty Ltd; "Powered Hydrofoil System"; European Patent Application No. 18883938; Extended European Search Report; dated Apr. 19, 2021; 8 pgs.

Bender Fredrik et al, "Slutrapport Evolo", (Apr. 23, 2009), URL: http://flygmac7.flyg.kth.se/cdio/old_projects/evolo/Evolo_slutrapport.pdf, XP055795995.

X-Jets, "Mono body/fuselage Concept—EFOIL.builders / Foils & Boards-", FOIL.zone, (Nov. 16, 2017), URL: https://foil.zone/t/mono-body-fuselage-concept/583, XP055795988.

Nikolai Hiorth, "Project Efoil 1.5 Electric Hydrofoil DIY", (Nov. 21, 2017), pp. 1-2, URL: https://www.youtube.com/watch?v=oPcYad5fXiU, XP054981678.

Singapore Application No. 11201911326R Filed Nov. 28, 2018; Singapore Written Opinion; Authorized Officer; Mr. P-Wee Wang; dated Sep. 1, 2021; 8 pgs.

Applicant: Fliteboard Pty Ltd; "Powered Hydrofoil System"; Chinese Application No. 201880087274.5; Chinese Office Action; dated Dec. 3, 2021; 18 pgs.

* cited by examiner

POWERED HYDROFOIL SYSTEM

RELATED APPLICATIONS

The present invention is a U.S. National Stage under 35 USC 371 patent application, claiming priority to Serial No. PCT/AU2018/051265, filed on 28 Nov. 2018; which claims priority of AU 2018222940, filed on 29 Aug. 2018; and AU 2017268537, filed on 28 Nov. 2017, the entirety of which are incorporated herein by reference.

TECHNICAL FIELD

The present invention generally relates to an underwater propulsion system, particularly but not exclusively an integrated electric motor and hydrofoil system used to power a board.

PRIOR APPLICATIONS

The present application claim priority from Australian Patent Number 2017268537 and Australian Patent Application Number 2018222940, the contents of which are hereby included in their entirety.

BACKGROUND

A recent development in watercraft technology is the attachment of a hydrofoil and a motor to a surfboard. These systems include an electric motor and a hydrofoil in combination. The hydrofoil elevates the board clear of the water when under power from the motor, reducing drag and providing high speed travel over the water.

The hydrofoil and motor are positioned towards a lower end of a mast, while an upper end of the mast is bolted to an underside of the board. One method of developing such a system has been to take an existing hydrofoil surfboard and insert a motor to part of the mast.

Many components required for operation of the motor may be housed in the board, such as batteries and/or control circuitry. These components must then be connected to the motor at the lower end of the mast by wires that are routed internally down the mast.

The combination of water and electricity, together with large changes in temperature, means that adequate sealing is difficult but very important. Adding to this complexity, the craft needs to be easily disassembled regularly for transport or for maintenance, but to still have adequate sealing every time it is assembled again for use.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

According to one example aspect of the invention, there is provided a hydrofoil system, including a fuselage having an elongate shape with a longitudinal axis, wherein a propeller is mounted to one end of the fuselage and a wing extends laterally from the fuselage.

In one form, the fuselage is configured for removable attachment to a mast, so that the mast when attached extends from the fuselage in a direction substantially orthogonal to the longitudinal axis and also substantially orthogonal to the wing.

In another form, the wing extends from the fuselage at an end of the fuselage opposite to the end to which the propeller is mounted. Preferably, the hydrofoil system has a direction of travel such that the end of the fuselage to which the wing is attached is a forward end and the end to which the propeller is mounted is a rear end.

In other particular, but non-limiting, example forms: a tail wing is connected to the fuselage by a tail strut; and the tail wing is positioned beyond the end of the fuselage to which the propeller is attached.

According to another example aspect of the invention, there is provided a hydrofoil system, including a fuselage having an elongate shape with a longitudinal axis, the fuselage having a propeller mounted at one end that is driven by a motor situated inside the fuselage, the hydrofoil system also including a first wing extending laterally from the fuselage at the opposite end to the propeller, and a tail wing that is connected to the fuselage by a tail strut.

In one form, the tail wing is positioned beyond the end of the fuselage to which the propeller is attached.

In another form, the fuselage is configured for attachment to a mast, so that the mast extends from the fuselage in a direction substantially orthogonal to the longitudinal axis and also substantially orthogonal to the first wing. In one example form, the mast is configured to attach to the opposite side of the fuselage to a location where the tail strut joins the fuselage. Such a form is advantageous due to the protection offered to the propeller by the tail strut in the event that the hydrofoil system strikes the bottom of a water body.

In another example form, the motor and fuselage include a key arrangement, whereby the motor is prevented from rotating within the fuselage.

In accordance with another optional embodiment, provided by way of example only, the propeller is driven by a shaft that is driven by the motor, the shaft being substantially aligned with the longitudinal axis of the fuselage. Preferably, the motor includes a gearbox that is connected to the shaft.

In another form, the motor has a cable connected thereto, the cable extending outside the fuselage, wherein a removable sealing system inhibits water ingress to the motor at the location where the cable is connected when the sealing system is installed in the fuselage.

In another particular, but non-limiting, example form, the sealing system includes: an end cap that seals against an inside surface of the fuselage, the end cap including a hole through which the cable passes; a deformable gland seal that is fitted about the cable and within the hole; and a seal cap that clamps the gland seal within the hole, thereby compressing the gland seal and causing the gland seal to press against the cable and the inside of the hole. In one form, a plurality of cables pass through a corresponding plurality of holes in the end cap, the gland seal and seal cap each being a single item configured to accommodate the plurality of cables.

According to another example aspect, there is provided a sealing system for inhibiting water ingress to a motor, the motor being housed inside a fuselage that is configured for use underwater, the sealing system including: an end cap that seals against an inside surface of the fuselage, the end cap including a hole through which a cable passes; a deformable gland seal that is fitted about the cable and within the hole; and a seal cap that clamps the gland seal within the hole, thereby compressing the gland seal and causing the gland seal to press against the cable and the inside of the hole.

In another form, a plurality of cables pass through a corresponding plurality of holes in the end cap, the gland seal and seal cap each being a single item configured to accommodate the plurality of cables. In yet another form, a fastener connects the seal cap to the end cap, wherein tightening of the fastener increases the compression on the gland seal.

According to yet another optional aspect, there is provided a powered watercraft, including a main body connected to a hydrofoil system by a mast, the hydrofoil system being substantially as defined herein. In one form, the watercraft is a hydrofoil surfboard.

BRIEF DESCRIPTION OF FIGURES

Example embodiments should become apparent from the following description, which is given by way of example only, of at least one preferred but non-limiting embodiment, described in connection with the accompanying figures, wherein.

DETAILED DESCRIPTION

The following modes, given by way of example only, are described in order to provide a more precise understanding of the subject matter of a preferred embodiment or embodiments.

In the Figures, incorporated to illustrate features of an example embodiment, like reference numerals are used to identify like parts throughout the Figures.

A preferred embodiment of a hydrofoil system according to the invention will first be described with reference to FIGS. 1 to 4. The hydrofoil system 10 includes a fuselage 11 having an elongate shape with a longitudinal axis. The fuselage 11 has a propeller 12 mounted at one end that is driven by a motor situated inside the fuselage 11.

The hydrofoil system 10 has a first wing 14 extending laterally from the fuselage 11 at the opposite end to the propeller 12. A tail wing 22 is connected to the fuselage 11 by a fin 24 and extension 25. Together the fin 24 and extension 25 form a tail strut that holds the tail wing 22 in position.

The hydrofoil system 10 is advantageous because it integrates the motor housing and wings into a single, compact unit. That is, rather than have a fuselage with motor mounted above a separate hydrofoil system, as is the case in some prior art systems, the current system integrates these into a single setup.

The present hydrofoil system thereby results in fewer components and decreased surface area of the system. As such, this reduces the drag of the system in the water during use and thereby increases the performance and/or power requirement.

Additionally, the present system allows the propeller to be positioned lower, or closer to the wings. Otherwise stated, this system enables a greater distance to be provided between the propeller and a board that is located at the top of a strut that is connected to the hydrofoil system. This also has benefits during use, because it enables the board to be elevated further above the water and the wings to be closer to the surface, without the propeller breaking the surface and thereby losing power. As such, this may be considered a safer system to some of the prior art systems, or at least provide a benefit of performance.

A number of other example features will now be described, which are included in the embodiment shown in the Figures, but may not be provided in some alternative embodiments or may be provided in a different form in various other alternative embodiments.

Figure 1:
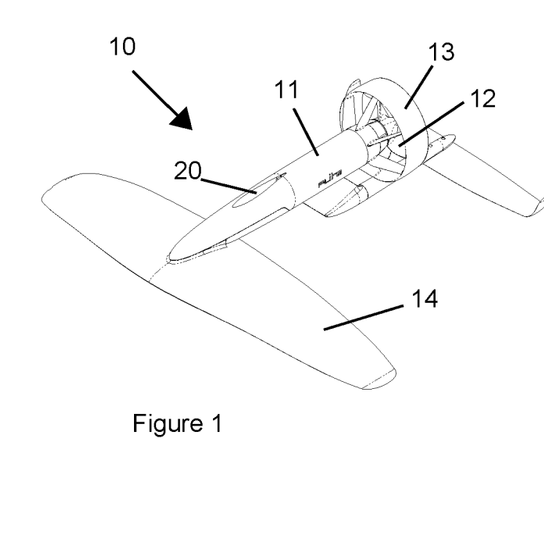
FIG. 1 illustrates an isometric view of a hydrofoil system according to an embodiment of the invention.

Referring to FIG. 1, an embodiment of a hydrofoil system 10 is shown. The hydrofoil system 10 includes a fuselage 11 having an elongate shape with a longitudinal axis. A propeller 12 and a shroud 13 are mounted at one end of the fuselage 11, and a wing 14 is mounted at the other end.

Figure 2:
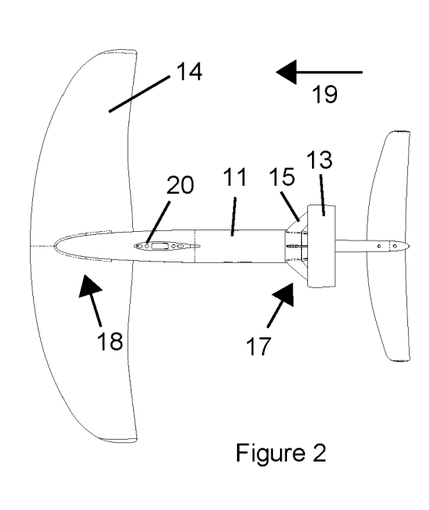
FIG. 2 illustrates a plan view of the hydrofoil system of FIG. 1.
Figure 3:
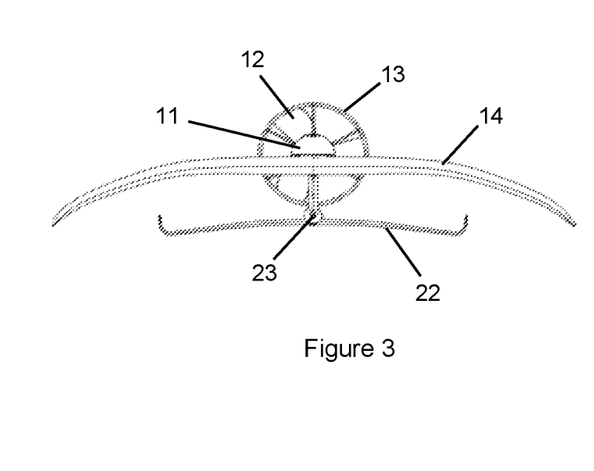
FIG. 3 illustrates a front view of the hydrofoil system of FIG. 1.

Referring to FIG. 2, the shroud 13 is connected by vanes 15 to a rear end 17 of the fuselage 11, while the wing 14 extends laterally from a front end 18 of the fuselage 11. For clarity, the intended direction of travel is shown by arrow 19.

The fuselage 11 is configured for removable attachment to a mast. The mast connects at an opening 20 located on the top of the fuselage 11. The mast when attached extends from the fuselage 11 in a direction substantially orthogonal to the longitudinal axis and also substantially orthogonal to the wing 14. That is, the mast extends vertically when viewed as in FIG. 3, for example. The other end of the mast is configured for attachment to a surfboard or other similar watercraft. It will be appreciated, however, that in some alternative embodiments the mast may not be readily removable.

Figure 4:
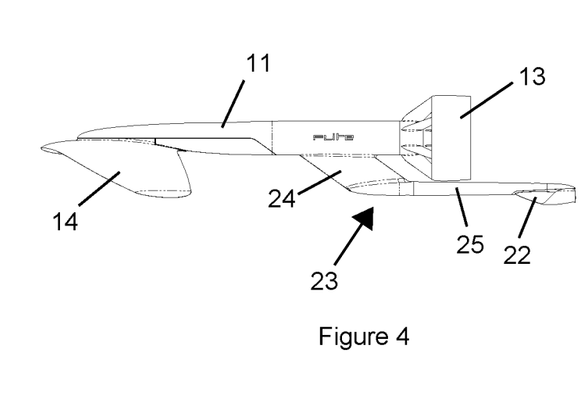
FIG. 4 illustrates a side view of the hydrofoil system of FIG. 1.

Referring to FIG. 4, a tail wing 22 is connected to the fuselage 11 by a tail strut 23. The tail strut 23 is made up of a fin 24 that is substantially vertical and connects to the fuselage 11, and a rearward extension 25. The extension 25 allows the tail wing 22 to be positioned beyond the rear end 17 of the fuselage 11 where the propeller 12 is attached.

The mast is configured to be attached to the opposite side of the fuselage 11 to where the tail strut 23 joins the fuselage 11. This is advantageous because during use the fin 24 is situated in front and/or below the propeller 12 and the rearward extension 25 extends underneath the propeller 12. Therefore, in the event that the water is too shallow and the hydrofoil system 10 strikes a bottom of the water body, the tail strut 23 will protect the propeller 12 from being damaged. This is preferred, because the propeller 12 is much more fragile that the tail strut 23, as well as the propeller 12 having the potential to cause damage to other items that it may contact.

Additionally, the tail strut 23 incorporating a vertical fin may be advantageous for performance characteristics of the system, depending on the precise shape and design of this fin. Further, the tail strut 23 allows the distance between the first wing 14 and the tail wing 22 to be increased, which has very significant performance benefits. This length may be adjustable by replacing the extension 25, and the distance between the wings is essentially only limited by the strength of the rearward extension 25.

Figure 5:
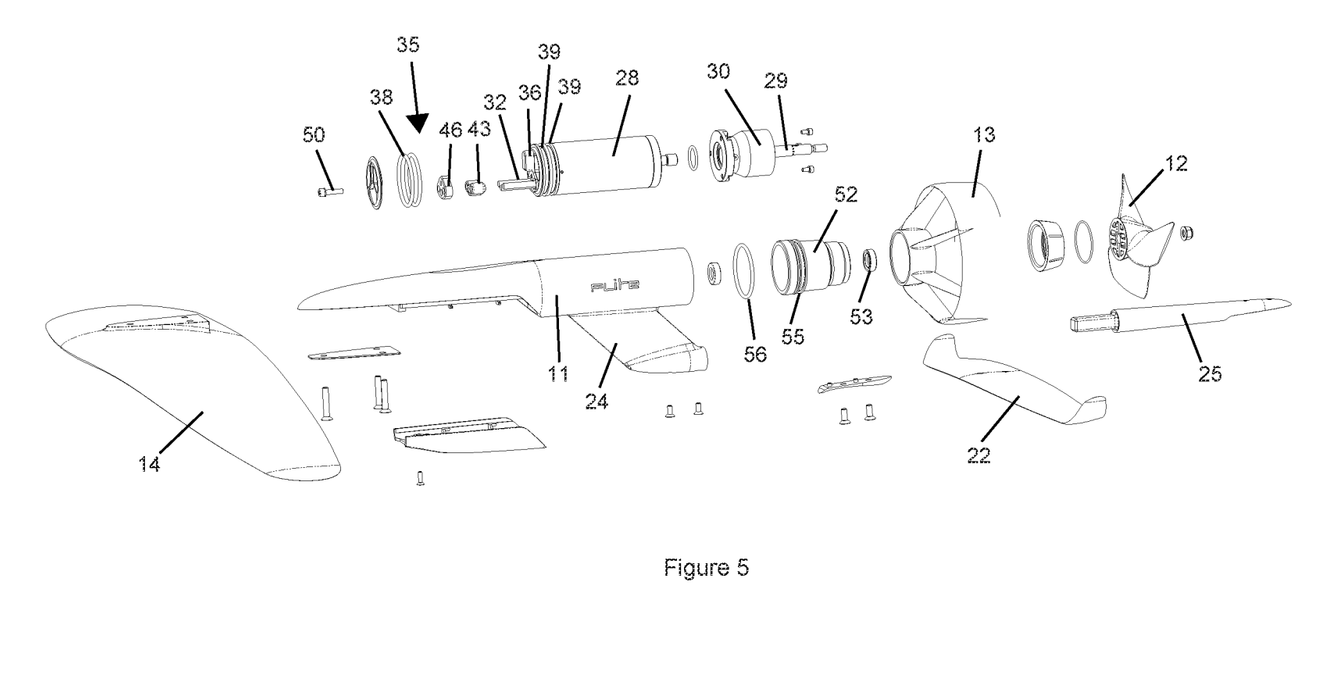
FIG. 5 illustrates an exploded view of the hydrofoil system of FIG. 1.
Figure 6:
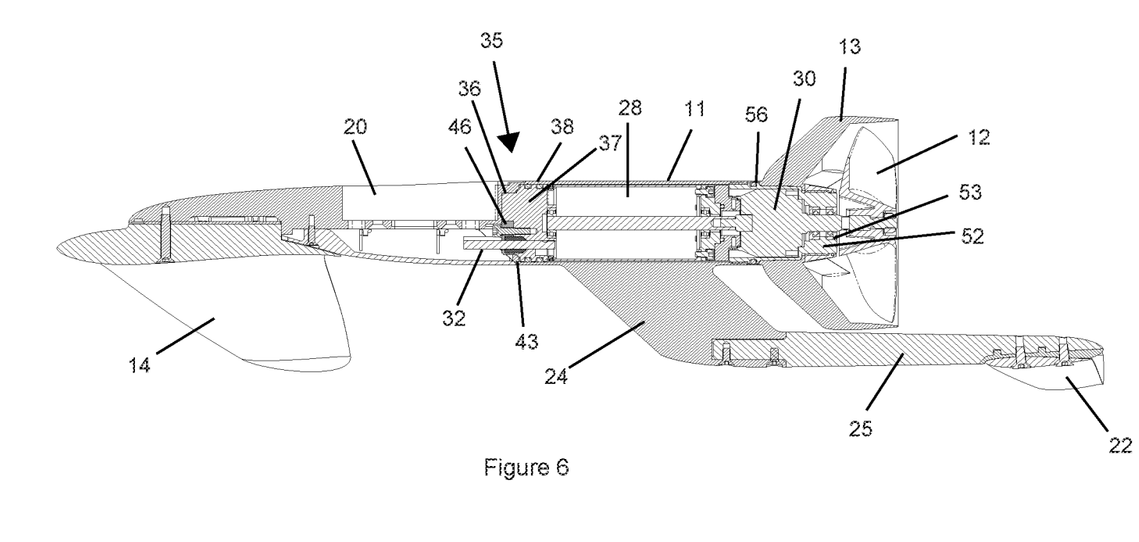
FIG. 6 illustrates a cross sectional side view of the hydrofoil system of FIG. 1.
Figure 7:
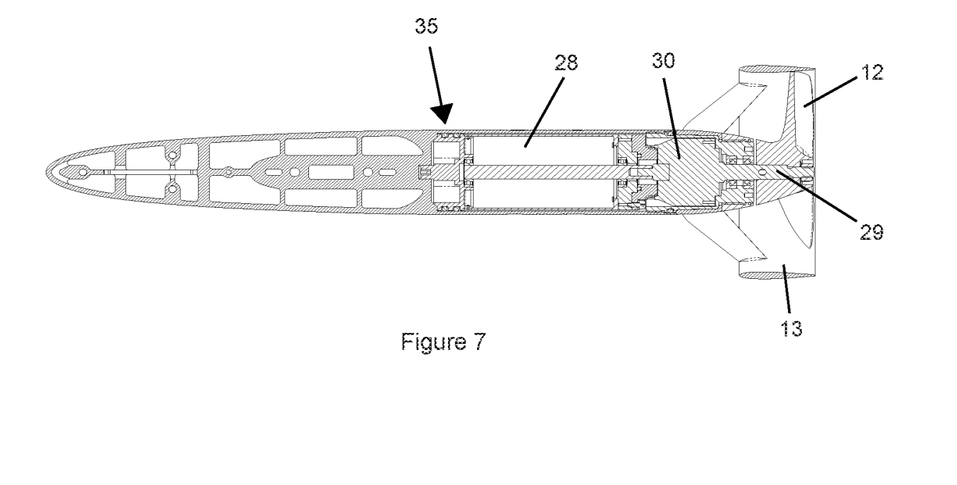
FIG. 7 illustrates a cross sectional plan view of the hydrofoil system of FIG. 1.

Referring to FIGS. 5 to 7, an electric motor 28 is housed inside the fuselage 11 when assembled. The motor 28 is connected to the propeller 12 by a shaft 29 that extends from a gearbox 30, allowing the motor 28 to drive the propeller 12. It can be seen in the figures that the shaft 29 is substantially aligned with the longitudinal axis of the fuselage 11.

Use of the gearbox 30 is advantageous because it allows a motor 28 with smaller diameter to be used. That is, a motor configured to operate at higher speed but with reduced torque can be used. Such a motor may be capable of producing equivalent power to another motor operating at lower speed but higher torque, but will be able to do so in a configuration that has a smaller size. This in turn allows a smaller diameter fuselage 11 to be used, which in turn is advantageous for reducing drag in the water.

Of course, however, it will be appreciated that some alternative embodiments of the invention may not use a gearbox or may use alternative forms of motor and/or gearbox systems.

The motor 28 has cables 32 connected thereto. The figures show the cables 32 in a shortened form for clarity, but in practice the cables 32 would extend outside the fuselage 11. The cables 32 may be attached to sockets or connectors of some form in the opening 20 where the mast attaches, or they may simply be long enough to extend through the opening 20 and up into the mast. In other alternative embodiments, however, the cables 32 may connect to other components housed within the fuselage 11.

A sealing system 35 is provided at a front end of the motor 28 to inhibit water ingress to the motor 28. The sealing system 35 is configured to be close to the location where the cable 32 is connected to the motor 28 when the sealing system 35 is installed in the fuselage 11. That is, the sealing system 35 prevents water ingress to the motor 28 while still allowing the cables 32 to extend through, so that power and communication to the motor 28 is still possible.

The sealing system 35 includes an end cap 37 that seals against an inside surface of the fuselage 11. The end cap 37 has a number of o-rings 38 that sit in grooves 39 (see FIG. 8) to help with this sealing the end cap 37 with the fuselage 11.

Figure 8:
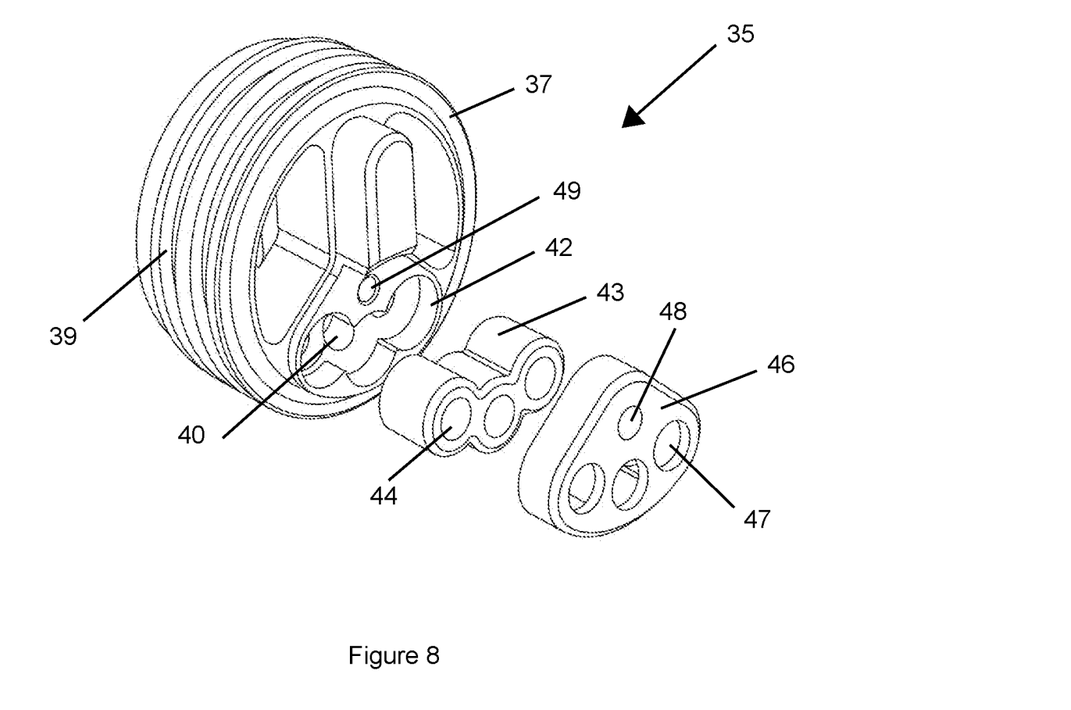
FIG. 8 illustrates an isometric view of a disassembled end cap, gland seal and seal cap.

The end cap 37 has three holes 40 through which the cables 32 pass. These holes 40 are located at the bottom of a recess 42 in which a gland seal 43 is fitted. The gland seal 43 is deformable and has three holes 44 that correspond to the holes 40 of the end cap 37.

A seal cap 46 acts as a compressing member that fits over and clamps the gland seal 43 in the recess 42. The seal cap 46 has cable holes 47 that correspond to the holes 44 of the seal 43 and the holes 40 of the end cap 37. The seal cap 46 also has a mounting hole 48 that corresponds to a mounting hole 49 in the end cap 37. A bolt 50 or other suitable fastener passes through the aligned mounting holes 49, 50, securing the seal cap 46 to the end cap 37 over the gland seal 43.

This compressing of the gland seal 43 causes the seal 43 to press against the cables 32 when they are situated through the inside of the holes 44. Tightening of the bolt 50 allows this compression to be increased as necessary.

This sealing system 35 therefore provides a watertight barrier between the front section of the fuselage 11 and the rear section of the fuselage 11 where the motor 28 is located, but still allowing the cables 32 to pass through, where they can then continue up the mast. This sealing system 35 allows a watertight seal to be maintained at all times during use, which is traditionally a significant challenge due to the temperature changes experienced and the pressure of the water when the motor is situated almost a metre below the surface.

The end cap 37, gland seal 43 and seal cap 46 are each a single item configured to accommodate the plurality of cables 32. In the embodiment shown, there are three cables 32, with the holes arranged in a V shape. While this requires a specially developed and manufactured gland seal 43 of the appropriate shape, for example, it is advantageous as it provides very good packaging of the cables in the limited space available.

It will be appreciated, however, that different numbers of cables, or even just a single cable, may be used in alternative embodiments, and this will require a different configuration of the sealing system 35. Alternatively, if a lower number of cables are used, plugs could be used in some of the holes of the present embodiment to avoid redesigning the sealing system 35.

The performance of the sealing system 35 in the preferred embodiment is also assisted by the design of the fuselage 11 itself. That is, as shown in FIG. 5, a large portion of the fuselage 11 and the fin 24 are formed as a single piece. Preferably, this is milled from a single piece of material such as aluminium, however it will be appreciated that many alternative manufacturing techniques may be used in alternative embodiments.

By forming the fuselage tube as a single piece, the motor 28 and sealing system 35 can be slid inside during assembly and simply seal against an inside wall of the fuselage 11. There is no requirement for any seams of the fuselage 11 to be sealed close to the motor, and therefore no danger of the fuselage 11 body close to the motor 28 from leaking.

The motor 28 assembly and the fuselage 11 also fit together with a key arrangement 36, whereby the motor 28 is prevented from rotating within the fuselage 11. That is, the motor 28 is slid into the single piece fuselage component and the front end of the motor assembly, or the end cap 37, mates with the inside of the fuselage 11 that is shaped accordingly.

At the rear end of the motor 28, a bearing cap 52 holds the bearing 53 for the motor shaft 29. The bearing cap also has a channel 55 for an o-ring 56 to seal the motor 28 in the fuselage 11. This similarly seals the rear end of the motor 28 with the fuselage 11 so that water also cannot enter from this end.

The hydrofoil system 10 is advantageous because it integrates the motor into the fuselage, rather than having a propulsion system somewhat separate from the hydrofoils. There are a number of challenges that this particular design seeks to address, including providing a strong, compact and rigid fuselage structure that connects a mast to the wings while also housing the motor. However, the integrated hydrofoil system that has been developed is advantageous over the prior art by combining the motor and hydrofoils into a single, compact unit.

The preferred embodiment has the main body of the fuselage constructed from one piece of aluminium, which is advantageous for strength, rigidity, motor cooling efficiency and sealing under pressure and varying temperature. Of course, a person skilled in the art will appreciate that other materials may be used in alternative embodiments.

The motor system is advantageous because the gland system seals the motor while simultaneously locking it in place. The system has been designed for easy assembly, maintenance and durability. Materials have been considered carefully to reduce weight and also corrosion concerns, as the system is designed for use in water, which may be salt or fresh.

The system can accommodate different wings, which are easily interchangeable, for different rider weights and riding styles. It also packs down for easy transport, which is important for a watercraft of this size and style.

The system described incorporates a large propeller, rather than a jet that some may use, for maximum efficiency of the electric motor. Of course, alternative propulsion means may be used in alternative embodiments, as will be appreciated by those skilled in the art.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above" and "below" and the like are used as words of convenience to provide reference points and are not to be construed as limiting terms.

Whilst the present invention has been described with reference to particular embodiments, it will be understood that many modifications will be apparent to those skilled in the art. All such variations and modifications should be considered to fall within the scope of the invention as broadly described and as claimed below.

Throughout this specification and the claim which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

| List of parts: | |
|---|---|
| 10 | Hydrofoil system |
| 11 | Fuselage |
| 12 | Propeller |
| 13 | Shroud |
| 14 | Wing |
| 17 | Rear end |
| 18 | Front end |
| 19 | Direction of travel |
| 20 | Opening |
| 22 | Tail wing |
| 23 | Strut |
| 24 | Fin |
| 25 | Extension |
| 28 | Motor |
| 29 | Shaft |
| 32 | Cables |
| 35 | Sealing system |
| 37 | End cap |
| 38 | O-ring |
| 39 | Groove |
| 40 | Hole (end cap) |
| 42 | Recess |
| 43 | Gland seal |
| 44 | Hole (gland seal) |
| 46 | Seal cap |
| 47 | Hole (seal cap) |
| 48 | Mounting hole (seal cap) |
| 49 | Mounting hole (end cap) |
| 50 | Fastener |
| 52 | Bearing cap |
| 53 | Bearing |
| 55 | Channel |
| 56 | O-ring |

The invention claimed is:

1. A hydrofoil system, comprising a fuselage having an elongate shape with a longitudinal axis, the fuselage having a propeller mounted at one end that is driven by a motor situated inside the fuselage, the hydrofoil system also comprising a first wing extending laterally from the fuselage only at the opposite end to the propeller, a tail wing that is connected to the fuselage by a tail strut, and a key arrangement that couples the motor with the fuselage to prevent the motor from rotating within the fuselage, wherein the fuselage is attached to a mast, so that the mast extends from the fuselage in a direction substantially orthogonal to the longitudinal axis and also substantially orthogonal to the first wing, the mast being attached to the opposite side of the fuselage to a location where the tail strut joins the fuselage, wherein the tail strut is attached to the fuselage at a location that is longitudinally spaced away from the mast.

2. The hydrofoil system according to claim 1, wherein the tail wing is positioned beyond the end of the fuselage to which the propeller is attached.

3. The hydrofoil system according to claim 1, wherein the hydrofoil system has a direction of travel such that the end of the fuselage to which the first wing is attached is a forward end and the end to which the propeller is mounted is a rear end.

4. The hydrofoil system according to claim 1, wherein the propeller is driven by a shaft that is driven by the motor, the shaft being substantially aligned with the longitudinal axis of the fuselage.

5. The hydrofoil system according to claim 4, wherein the motor includes a gearbox that is connected to the shaft.

6. The hydrofoil system according to claim 1, wherein the motor has a cable connected thereto, the cable extending outside the fuselage, wherein a removable sealing system inhibits water ingress to the motor at the location where the cable is connected when the sealing system is installed in the fuselage.

7. The hydrofoil system according to claim 6, wherein the sealing system comprises:
   an end cap that seals against an inside surface of the fuselage, the end cap comprising a hole through which the cable passes;
   a deformable gland seal that is fitted about the cable and within the hole; and
   a seal cap that clamps the gland seal within the hole, thereby compressing the gland seal and causing the gland seal to press against the cable and the inside of the hole.

8. The hydrofoil system according to claim 7, wherein a plurality of cables pass through a corresponding plurality of holes in the end cap, the gland seal and seal cap each being a single item configured to accommodate the plurality of cables.

9. The hydrofoil system according to claim 1, comprising:
   a sealing system for inhibiting water ingress to the motor, the sealing system comprising:
   an end cap that seals against an inside surface of the fuselage, the end cap comprising a hole through which a cable passes;
   a deformable gland seal that is fitted about the cable and within the hole; and
   a seal cap that clamps the gland seal within the hole, thereby compressing the gland seal and causing the gland seal to press against the cable and the inside of the hole.

10. The hydrofoil system according to claim 9, wherein a plurality of cables pass through a corresponding plurality of holes in the end cap, the gland seal and seal cap each being a single item configured to accommodate the plurality of cables.

11. The hydrofoil system according to claim 9, wherein a fastener connects the seal cap to the end cap, wherein tightening of the fastener increases the compression on the gland seal.

12. The hydrofoil system according to claim 1, wherein the tail strut comprises a fin that extends from the fuselage and an extension that connects the tail wing to the fin.

13. A powered watercraft, comprising a main body connected to a hydrofoil system, the hydrofoil system being defined according to claim 1.

14. A hydrofoil system, comprising a fuselage having an elongate shape with a longitudinal axis, the fuselage having a propeller mounted at one end that is driven by a motor situated inside the fuselage, the hydrofoil system also comprising a first wing extending laterally from the fuselage only at the opposite end to the propeller, and a tail wing that is connected to the fuselage by a tail strut, wherein the tail wing is positioned beyond the end of the fuselage to which the propeller is attached, wherein the fuselage is attached to a mast, so that the mast extends from the fuselage in a direction substantially orthogonal to the longitudinal axis and also substantially orthogonal to the first wing, wherein the mast is attached to the opposite side of the fuselage to a location where the tail strut joins the fuselage, wherein the hydrofoil system has a direction of travel such that the end of the fuselage to which the first wing is attached is a forward end and the end to which the propeller is mounted is a rear end and wherein the tail strut is attached to the fuselage at a location that is longitudinally spaced away from the mast.

15. The hydrofoil system according to claim 14, wherein the propeller is driven by a shaft that is driven by the motor, the shaft being substantially aligned with the longitudinal axis of the fuselage, wherein the motor includes a gearbox that is connected to the shaft.

16. A hydrofoil system, comprising a fuselage having an elongate shape with a longitudinal axis, the fuselage having a propeller mounted at one end that is driven by a motor situated inside the fuselage, the hydrofoil system also comprising a first wing extending laterally from the fuselage only at the opposite end to the propeller, and a tail wing that is connected to the fuselage by a tail strut, wherein the tail wing is positioned beyond the end of the fuselage to which the propeller is attached, wherein the fuselage is attached to a mast, so that the mast extends from the fuselage in a direction substantially orthogonal to the longitudinal axis and also substantially orthogonal to the first wing, the mast being attached to the opposite side of the fuselage to a location where the tail strut joins the fuselage, wherein the propeller is driven by a shaft that is driven by the motor, the shaft being substantially aligned with the longitudinal axis of the fuselage, wherein the motor includes a gearbox that is connected to the shaft, and wherein the tail strut is attached to the fuselage at a location that is longitudinally spaced away from the mast.

* * * * *